United States Patent [19]

Brookes et al.

[11] 3,991,852

[45] Nov. 16, 1976

[54] LADDER AIDS

[76] Inventors: Malcolm J. Brookes, 30 E. 68th St., New York, N.Y. 10021; James Sheridan, Box 295-A Rte. 1, Englishtown, N.J. 07726; Douglas M. Spranger, 23 Fiske Place, Brooklyn, N.Y. 11215

[22] Filed: Feb. 7, 1975

[21] Appl. No.: 547,801

[52] U.S. Cl. .................................. 182/169; 182/127

[51] Int. Cl.[2] ...................... E06C 1/397; E06C 1/20

[58] Field of Search ............... 182/127, 20, 21, 169, 182/121; 280/47.13 R, 63, 79.1, 13; 248/316 D, 226 E, 351, 357, 210, 353

[56] References Cited

UNITED STATES PATENTS

| | | | |
|---|---|---|---|
| 318,600 | 5/1885 | Cronemeyer | 182/127 |
| 535,082 | 3/1895 | Snell | 182/21 |
| 1,112,511 | 10/1914 | Winn | 182/121 |
| 1,318,635 | 10/1919 | Whitaker | 280/13 |
| 1,589,351 | 6/1926 | Blaw | 182/127 |
| 2,046,516 | 7/1936 | Johnson | 182/169 |
| 2,147,473 | 2/1939 | Van Riper | 182/169 |
| 2,426,244 | 8/1947 | Sitton | 280/47.13 R |
| 2,640,236 | 6/1953 | Hume | 248/316 D |
| 2,818,265 | 12/1957 | Calderwood | 280/13 |
| 3,154,281 | 10/1964 | Frank | 248/316 D |
| 3,321,211 | 5/1967 | Bryant | 280/13 |
| 3,612,218 | 10/1971 | Blair | 182/127 |
| 3,731,947 | 5/1973 | Fontaine | 182/127 |

*Primary Examiner*—Reinaldo P. Machado

[57] ABSTRACT

Aid devices to facilitate the transport and raising of heavy ladders. To raise or lower the ladder, a lifter is provided in the form of a long pole having a transverse piece attached to one end thereof, the length of the piece being almost equal to the distance between the sidepieces of the ladder. Secured to the ends of the piece are resilient clips adapted to engage and clamp onto any rung of the ladder to be raised. In order to transport the ladder to a work site, a caddy is provided in the form of a pair of transverse pieces having clips installed thereon, the pieces being attached at spaced positions to the bridge of a two-wheeled carriage so that the pieces are adapted to straddle and engage a pair of adjacent rungs on the ladder in wheel-barrow position.

4 Claims, 10 Drawing Figures

LADDER AIDS

BACKGROUND OF THE INVENTION

This invention relates generally to the handling of ladders, and especially to aid devices facilitating the transport of heavy ladders and the raising thereof.

A ladder, which is a structure for climbing up and down, consists of two sidepieces or rails joined at intervals by crosspieces or rungs on which one may step. In order to reach heights in excess of fifteen feet, use is often made of multi-section, extendable ladders.

Extension ladders are relatively heavy and cumbersome and they are difficult to handle even in the collapsed state in which the sections overlie each other. The difficulties experienced in carrying and raising extension ladders is severely compounded in windy, inclement weather. Attempts have been made to reduce these difficulties by fabricating them from lightweight materals, such as aluminum. There are, however, many instances where the use of electrically-conductive, light-weight materials can pose severe safety hazards, as for example in the proximity of overhead electrical feeder cables.

On the other hand, electrically non-conductive, high structural strength ladders, such as those constructed from plastic rerinforced fiber glass, have a weight comparable to wood. While such ladders are electrically safe and obviate problems of structural degradation due to weather conditions, they fail because of their weight and size to solve the handling problem. If, therefore, one needs to bring a multi-section ladder to a work site, whether the ladder is of light-weight metal, wood or fiber glass, it can take two men to perform this task and then to lift the ladder from the ground to a properly raised position against a wall.

Because of the high cost of professional labor and household assistance, there is currently a strong do-it-yourself trend in the United States. Thus many jobs such as house painting and roof repair, which call for ladders, are performed by the homeowner and in some instances by women. The manipulation of ladders by do-it-yourselfers represents a serious problem and may be hazardous, particularly if only a single person is available to carry out this task, as is generally the case.

While, in the past, women had not been expected to make use of ladders, the movement toward equality in all fields has reached a point where women are now employed in manual jobs heretofore reserved to men and requiring the use of ladders. This is particularly true in the public utilities fields of telephone and electricity supply where there is presently heavy emphasis by the federal government on the equal employment of women in outside crafts jobs, such as linesmen.

Thus, should an individual of modest strength find it necessary to transport a multi-section ladder, say from a garage at the rear of a house to a work site at the front of the house, the individual may strain himself in carrying out this task. And even should the individual succeed in getting the ladder to the site, he is then faced with the problem of lifting the ladder from a horizontal to a vertical position, and then to an inclined position against a wall.

If we assume a collapsed ladder composed of two over-lapped fourteen foot sections, and a worker who is say five feet, seven inches tall, it will be appreciated that the raising of this ladder from a horizontal position may be quite troublesome, for at some stage the worker will find himself below the inclined ladder holding onto a rung less than midway from the ground end of the ladder. The worker must now from this position of poor mechanical advantage, try to elevate the ladder to a vertical position and he may find that he lacks the strength to do so.

The physical act of exerting force upon the ladder is not a simple one in which the worker merely pushes upwards. Once the ladder is above his head, the worker is required to exert some component of muscular effort in a forward direction as he walks forward while continuing to raise the ladder. Under certain circumstances, depending upon the physical stature of the worker, a situation may arise in which the total, resultant force the worker is called upon to exert actually exceeds the weight of the ladder by an appreciable amount.

It is also to be noted that it is necessary for a worker of modest stature to rest the lower end of the ladder against some fixed abutment. By exerting the horizontal component of raising force against this abutment the worker avoids acting as a fulcrum himself. Then, as he proceeds to walk towards the lower end of the ladder, he passes below the center of gravity of the ladder. Thus at one point in the course of the raising operation, the ladder will tend to turn about the point of application of the raising force. Should the lower end of the ladder slip at this critical moment, bodily injury may occur.

In order to more fully appreciate this problem, one must take into account elementary principles of mechanics and in particular the factors of mechanical advantage and work. In a lever, mechanical advantage defines the ability of any available force to overcome a resisting force and depends on the point relative to the fulcrum at which the available force is applied.

Considering now a ladder lying on the ground which is to be raised to a vertical position, the fulcrum is the lower or ground end of the ladder, the available force is the strength of the individual seeking to raise the ladder, while the resisting force is the ladder load. At the outset, when the individual grasps the high end of the ladder to lift it from the ground, the mechanical advantage has its greatest value, for the point at which the available force is now applied is at the maximum distance from the fulcrum.

But since the worker is not nearly tall enough to fully raise the ladder, he must, as the high end of the ladder goes through an upward arc, move under the ladder in the direction of the low end of the fulcrum. The closer he gets to the low end, the poorer becomes the mechanical advantage and the greater the strength then necessary to effect a lifting action. And, as previously stated, should he be of such a stature that he proceeds below the center of gravity while raising the ladder, then, unless the lower end of the ladder is fixed to the ground in some manner, then the ladder will rotate about the point of application of the lifting force.

To express the problem in terms of work, which in physics equals the applied force times the distance, the force is, of course, dependent on the strength of the individual handling the ladder and is therefore limited, but the distance depends on the point at which the force is applied. Hence the distance traversed by the point at which the force is applied is greatest at the high end of the ladder and is reduced as one shifts this point toward the fulcrum or low end. It therefore requires much more physical strength to produce the work necessary to raise the ladder when the force is applied at a point near the fulcrum than when it is applied near the high end of the ladder.

Similarly, to carry a heavy ladder in conventional fashion, the individual must lift the ladder from the ground and he therefore must have sufficient strength therefor. Moreover, the point at which he holds the ladder represents a fulcrum and unless the ladder's weight on either side of the fulcrum is balanced, the ladder will tip. As a practical matter, the size and weight of most sectional ladders are such as to make it hard for a man of modest strength and stamina to carry it, to say nothing of a woman's ability to do so, for it is a well-accepted principle of the sciences of biomechanics and human engineering that a woman possesses about 55 percent of a man's strength in the arm and shoulder muscles, and about 80 percent of a man's strength in the muscles in the hip and lower leg.

SUMMARY OF THE INVENTION

In view of the foregoing, it is the main object of this invention to provide devices to aid in the transport of ladders and in the raising thereof so that a person of modest strength is capable of safely performing these tasks without undue exertion.

More particularly, it is an object of the invention to provide a caddy which is readily attachable to the rungs of a ladder somewhere adjacent to the point of balance, whereby the ladder may then be transported by wheeling it to a work site.

Also an object of the invention is to provide a lifter which is attachable to a rung of a ladder to improve the mechanical advantage and thereby to facilitate and to make more safe the raising or lowering thereof.

Still another object of the invention is to provide a low-cost ladder caddy and a lifter which are reliable and efficient in operation and which make it possible for women and others normally incapable of handling heavy ladders to do so without difficulty or hazard.

Briefly stated, these objects are attained in a lifter adapted to raise a large, heavy ladder, the lifter being constituted by a long pole having a transverse piece attached to one end thereof, the length of this piece being almost equal to the distance between the sidepieces of the ladder or the sidepieces of the extension of the ladder, if it has one, so that it is receivable therebetween.

Secured to the ends of the transverse piece are resilient plastic clips adapted to engage and clamp onto any rod-like rung of the ladder to be raised. Hence the lifter acts as an arm extension making it possible to engage a higher rung of the ladder than is normally possible so as to afford a sufficient degree of mechanical advantage to facilitate the lifting operation.

In the caddy for transporting the ladder, a pair of such transverse pieces having clips thereon are mounted at spaced positions on the bridge of a two-wheel carriage so that the pieces are adapted to straddle and engage a pair of adjacent rungs in the ladder, the carriage making it possible to handle the ladder in wheel-barrow or two-wheeled cart style. Thus in the case of a heavy ladder, one may use the caddy to bring the ladder to a work site and then apply the lifter to the ladder to raise it into a work position.

OUTLINE OF DRAWING

For a better understanding of the invention as well as other objects and further features thereof, reference is made to the following detailed description to be read in conjunction with the accompanying drawing, wherein.

DESCRIPTION OF INVENTION

Figure 2:
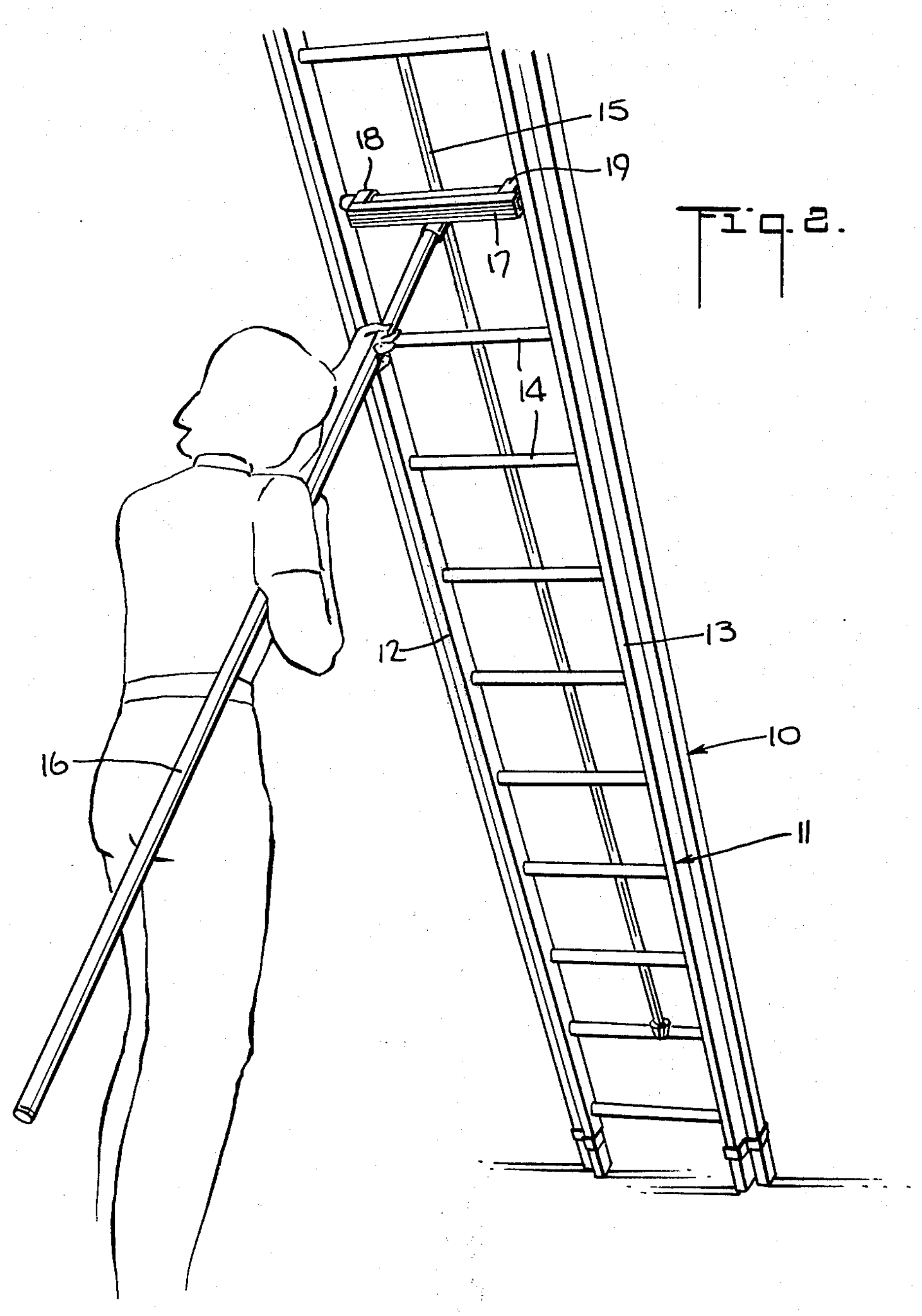
FIG. 2 is a perspective view of the lifter attached to the ladder, with the ladder being raised to a work position.
Figure 1:
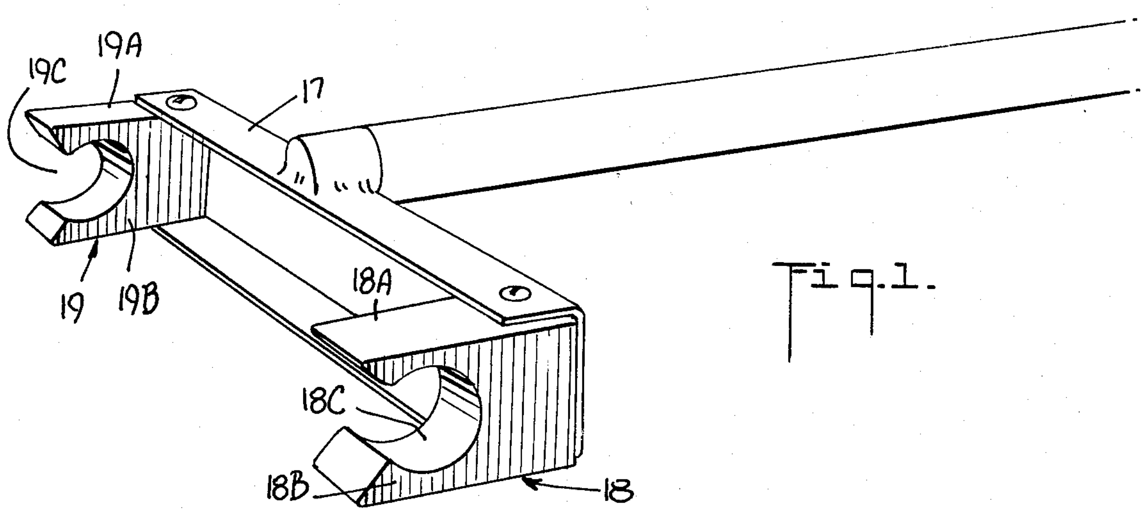
FIG. 1 is a perspective view of a ladder lifter in accordance with the invention.
Figure 4:
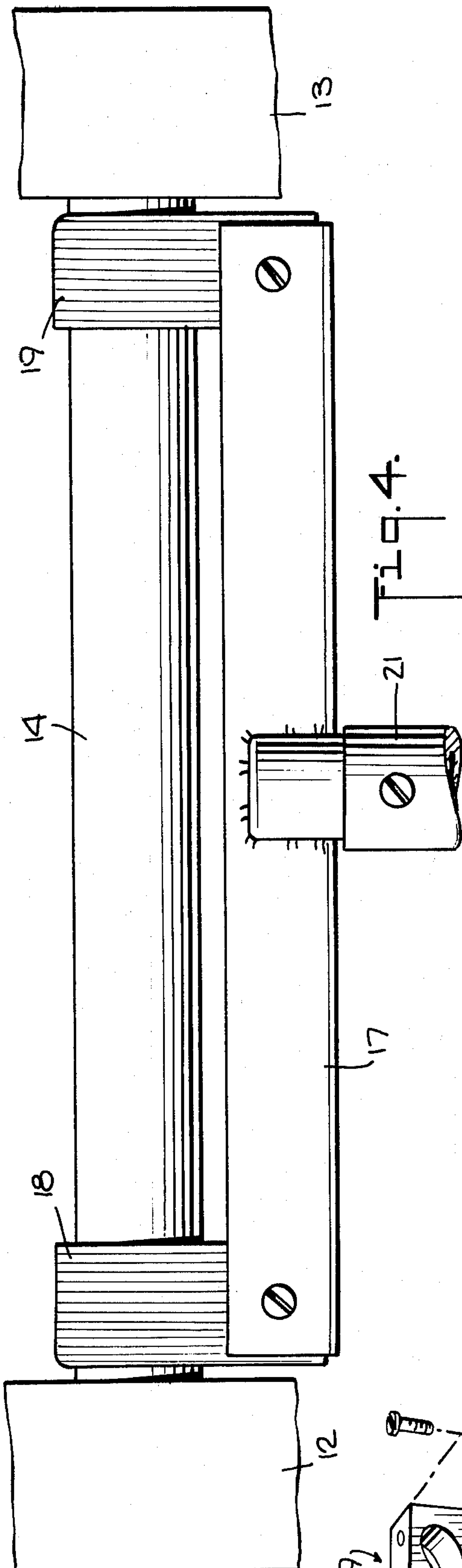
FIG. 4 is an elevational view of the lifter coupled to the ladder.
Figure 3:
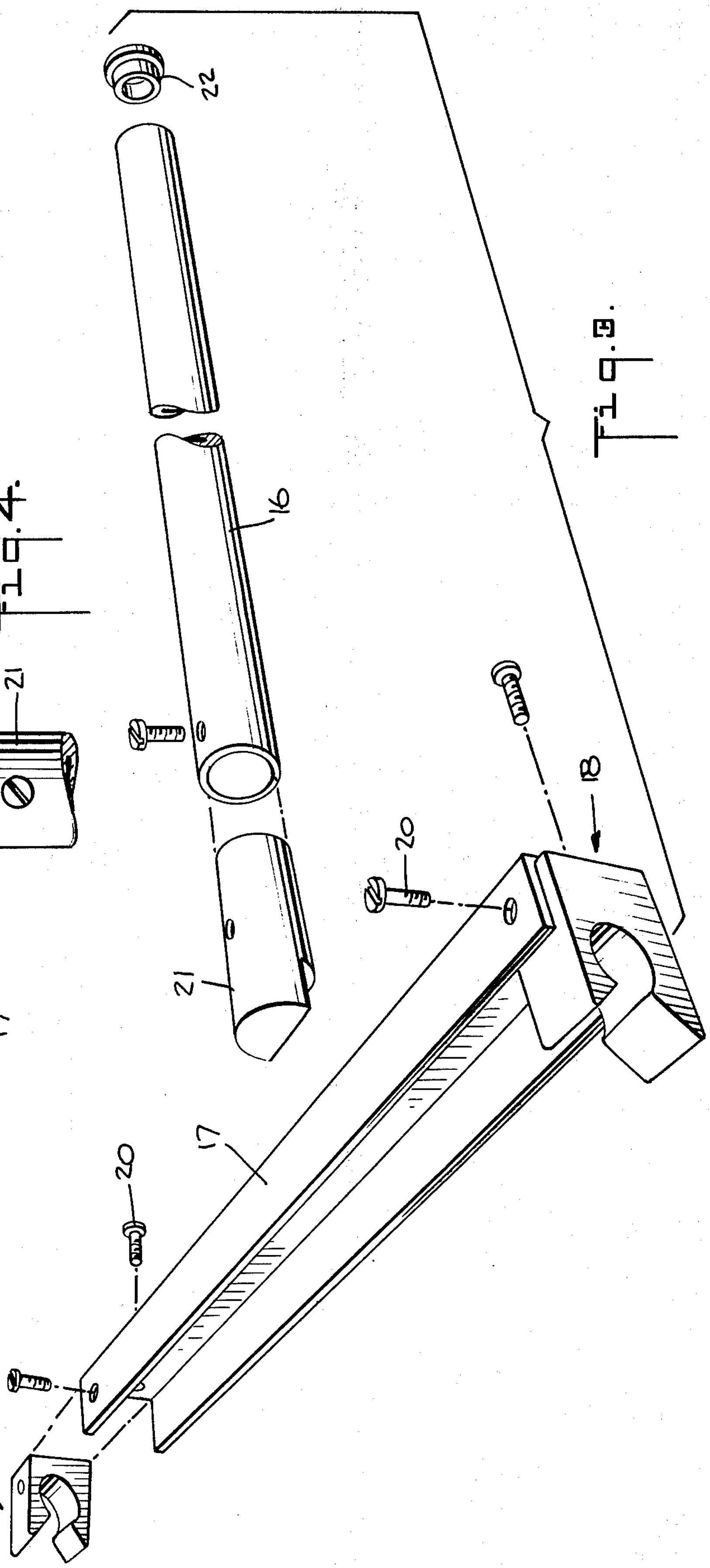
FIG. 3 is an exploded view of the lifter.

The Lifter:

Referring now to FIGS. 1 to 4, there is shown a ladder lifter in accordance with the invention, the lifter beinng illustrated as applied to an extensible ladder formed by inner and outer sections 10 and 11. Since the lifter is shown in FIG. 2 in engagement with a rung on the extension section 11 of the ladder, we shall describe this section in greater detail.

Ladder section 11 is composed of sidepieces or rails 12 and 13 and a series of spaced crosspieces or rungs 14 having a rod-like formation. In using such a sectioned ladder, it must first be raised while in the collapsed state to a vertical position in which the extension section faces the raiser. Thereafter, by means of a block and tackle 15, the outer section 11 is extended above inner section 10 to a desired height.

The lifter is constituted by a long pole 16, one end of which is attached to the midpoint of one side of a transverse piece 17 having a channel formation. A pair of clips 18 and 19 are installed in this piece at opposite ends thereof. Clips 18 and 19 project fractionally beyond the end of transverse piece 17 to avoid contact between the transverse piece and the ladder sidepieces, thereby avoiding damage to the sidepieces. The leading edges of the clips are rounded to avoid injury which might possibly occur to the sidepieces of a wooden ladder. The length of transverse piece 17 is almost equal to the space between rails 12 and 13 of the ladder section so that it fits nearly therebetween.

Clips 18 and 19, which are held in position within the channel of transverse piece 17 by suitable screws 20, are formed of a suitable resilient plastic material in block form. The use of plastic avoids damage to the ladder rungs if the rungs are made of wood. Block 18 is cut to define a pair of spring jaws 18A and 18B and a circular cavity 18C dimensioned to accommodate a rung of the ladder. Block 19 is likewise cut to define spring jaws 19A and 19B and cavity 19C. The transverse piece 17 is welded at its midpoint on one side to a metal plug 21 which is socketed within the top end of pole 16. The pole is preferably constituted by a rod fabricated from an electrically non-conductive material, such as reinforced fiber glass, epoxy or a similar structural insulator. For the sake of weight reduction, the pole may be in the form of a hollow pipe, the other end of the pipe being closed by a cap 22. The cap is made from a material having a high coefficient of friction, thereby allowing the user to prop the ladder up at about 30 or 40 degrees of inclination and to take a rest before completing the task of raising the ladder to a vertical position.

Thus to couple the lifter to the ladder, clips 18 and 19 are applied above the midpoint of the ladder to a relatively high rung thereof to force apart the spring jaws and cause the rung to be received and held within the cavities of the clips. The lifter, because it affords improved good mechanical advantage, makes it possible for the user, as shown in FIG. 2, to raise or lower the ladder without difficulty and without undue exertion. The lifter may be withdrawn from the rung simply by pulling off each clip at an angle to cause the jaws to release the rung. For very tall ladders, the pole may be provided with an extension section.

It is to be noted that because of the good mechanical advantage and the high point at which the raising force is applied, the larger component of the raising force will be vertical, with but a small fraction in the horizontal direction. Thus, the component of force tending to make the ladder end slip along the ground is minimized, and it now becomes easy to raise the ladder without having to brace the lower end against some fixed object or abutment. It will be appreciated that the danger of the ladder rotating about a fulcrum constituted by the point of application of the lifting force is now completely eliminated, for at no time would the lifter be applied to the ladder at a point below its midpoint.

The dimensions of the clip cavities are such as to permit rotation of the clips of the lifter relative to the engaged rung whereby the pole of the lifter may be caused to assume any desired angle relative to the plane of the ladder. The offset of the lifting pole 20 from the longitudinal axis of transverse piece 17 enables the user to lay the ladder flat on the ground with the pole attached to the underside, the pole extending outwards away from the ladder immediately prior to the lifting. Were it not for the offset, this initial starting point could not be achieved, for the pole, in seeking to lie parallel to the plane of the ladder, would interfere with the adjacent rung and therefore remain at some angle.

In addition, for convenience of storage, the offset of the lifting pole permits the lifter to be located on a ladder rung and then to lie flat between the sidepieces, taking up no more volumetric swept space than that occupied by the ladder itself. Alternatively, the lifter, rather than being detachable, may be made an integral part of the ladder.

In practice, the pole may be formed of two or more sections which are threadably coupled together, and the end of the pole may be threadably coupled to the transverse piece in the manner of a broomstick so that the lifter may be dismantled and stored or shipped in a small box.

Figure 5:
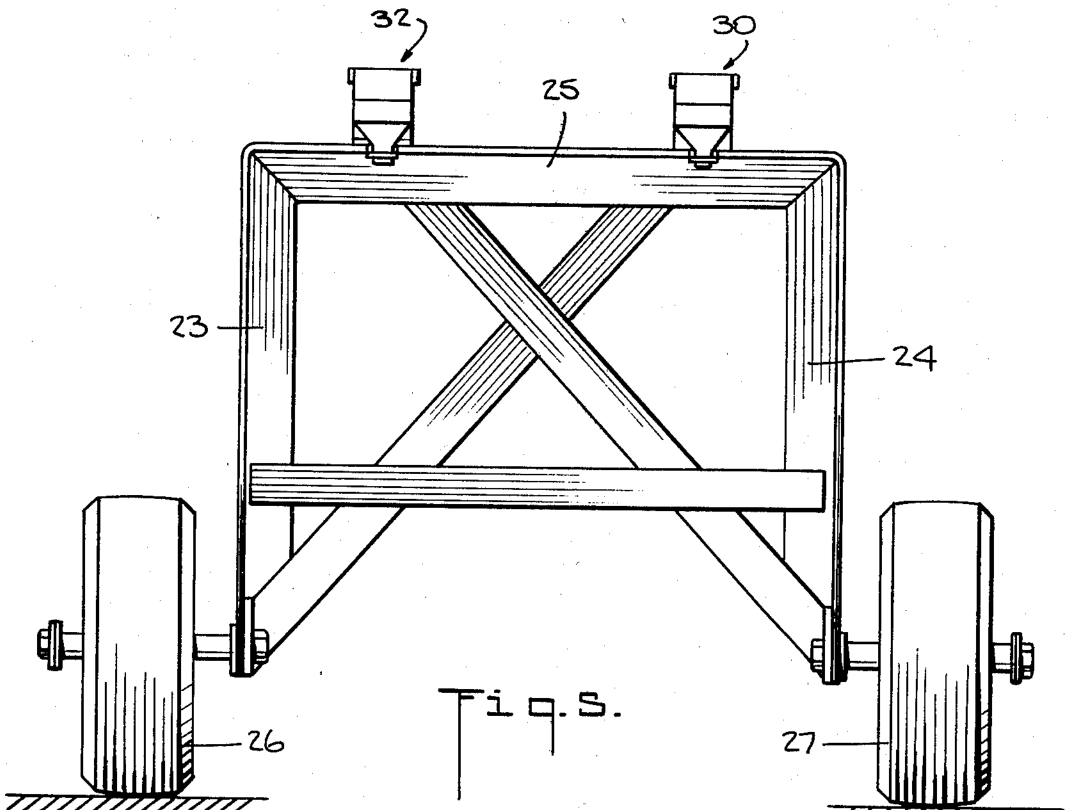
FIG. 5 is an elevational view of a ladder caddy in accordance with the invention.
Figure 6:
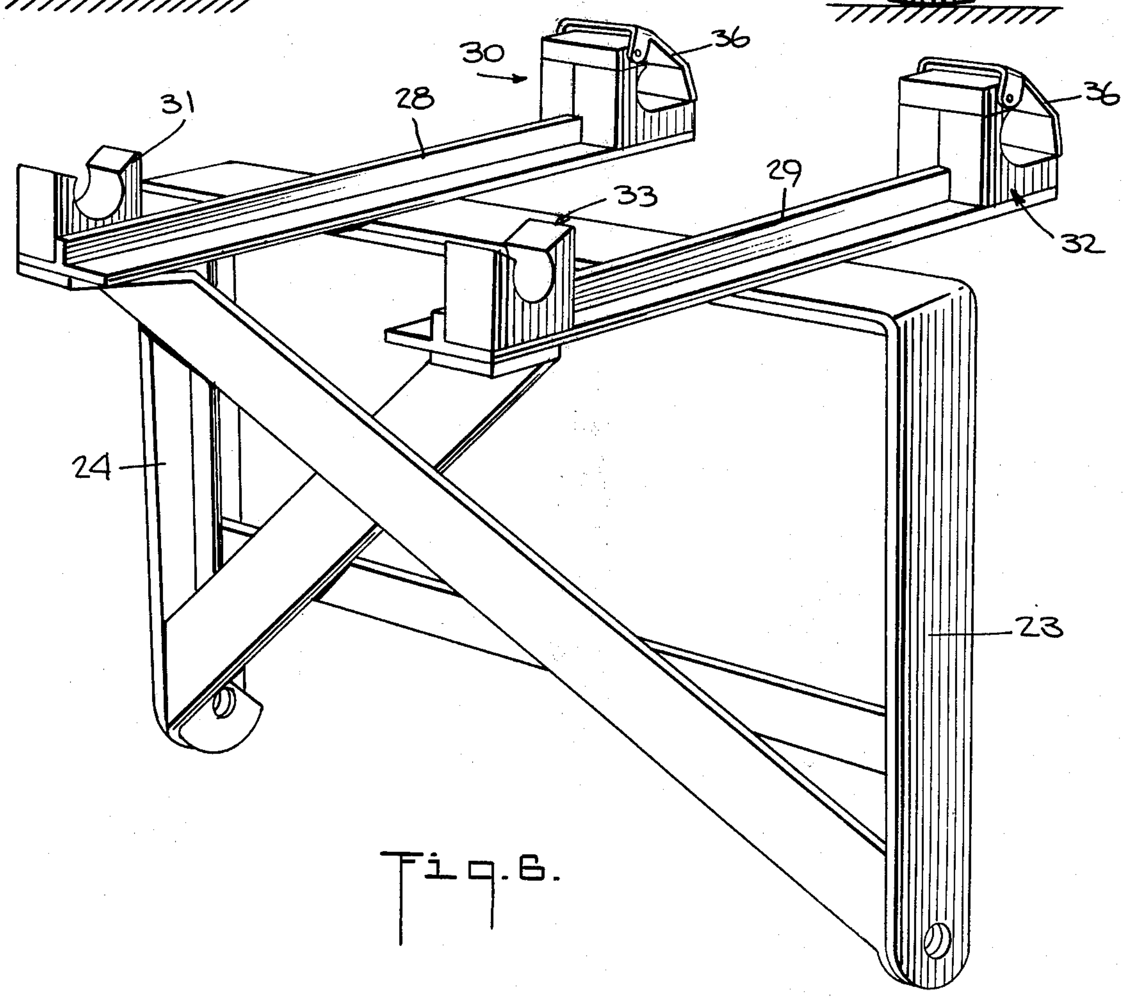
FIG. 6 is a perspective view of the caddy.
Figure 7:
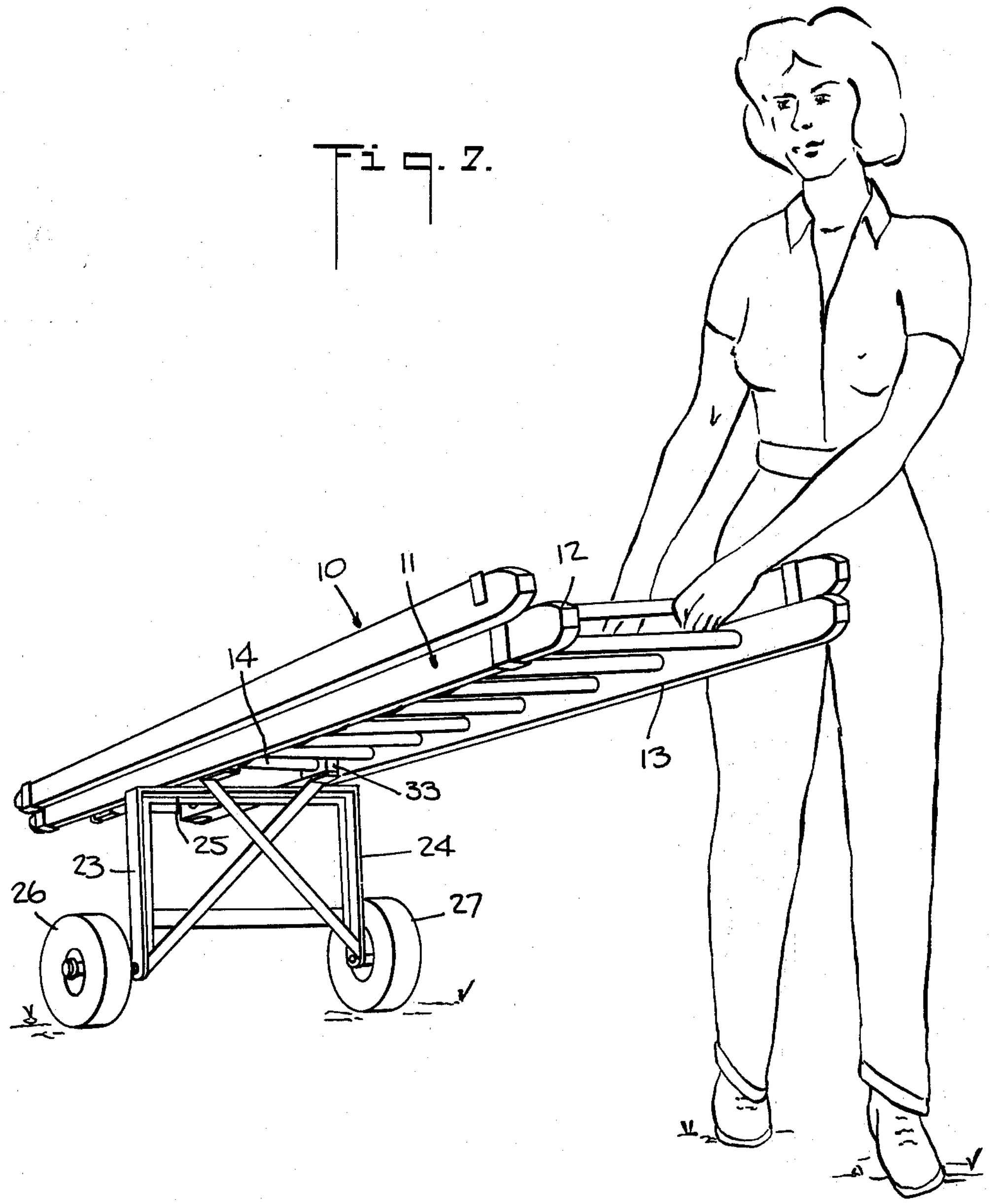
FIG. 7 shows the caddy attached to the ladder to facilitate the transport thereof.

The Ladder Caddy:

Referring now to FIGS. 5, 6 and 7, there is shown a caddy in accordance with the invention, the caddy being constituted by a two-wheel carriage formed by a pair of vertical legs 23 and 24 whose tops are joined together by a bridge member 25. Rotatably mounted on the lower end of the legs are wheels 26 and 27. Cross braces are provided to strengthen the carriage structure.

Figure 8:
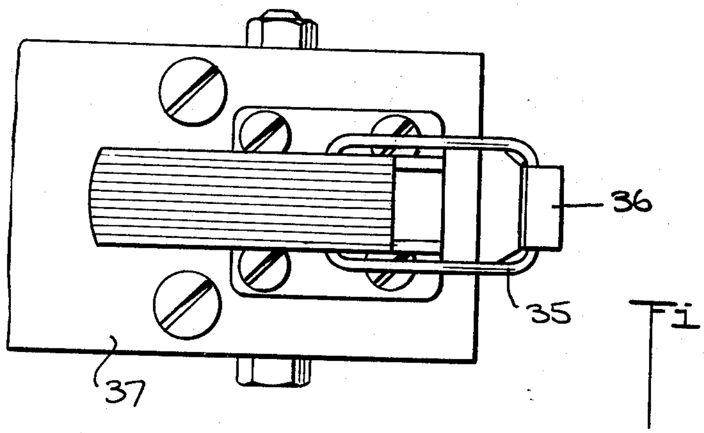
FIG. 8 is a plan view of a latched clip in accordance with the invention.
Figure 9:
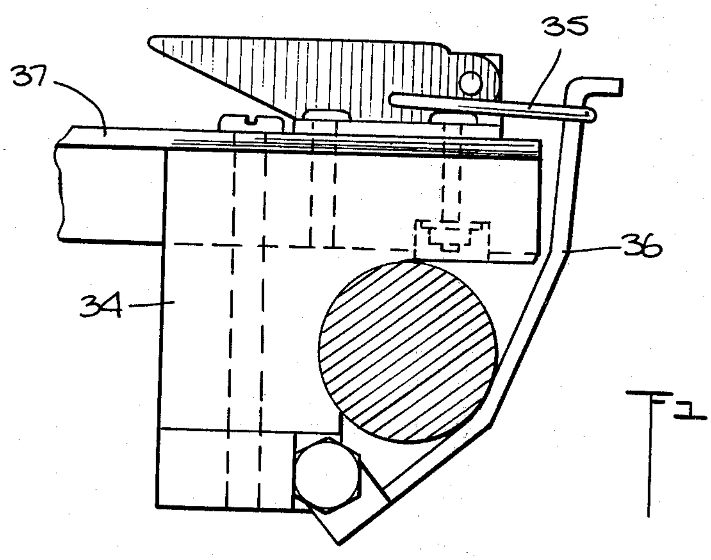
FIG. 9 is a section taken through the latched clip.
Figure 10:
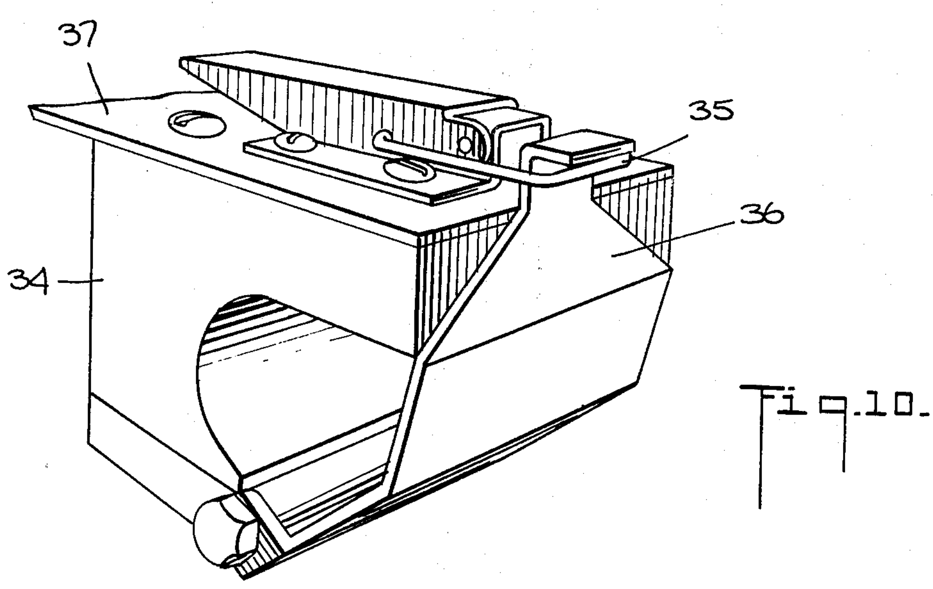
FIG. 10 is a perspective view of the latched clip.

Mounted at spaced positions on bridge 25 are a pair of transverse pieces 28 and 29 having an inverted T formation. In practice other formations, such as an L or U, may be used. Secured to the opposite ends of piece 28 and lying against the center web thereof are clips 30 and 31. Secured in a like manner to transverse piece 29 are clips 32 and 33. Clips 31 and 33 are identical to the clips of the lifter. Clips 30 and 32, as shown in FIGS. 8, 9 and 10, each consist of a block 34 cut to define a jaw to engage a rung of the ladder which is retained in that position by a latch 35 fastened by a suitable catch 36. The latch 35 is hinged onto a plate 37 secured to block 34.

The transverse space between corresponding clips 30–32 and 31–33 is almost equal to the distance between the rails of the ladder so that the clips fit therebetween, while the longitudinal space between clips 30 and 31 on piece 28 and between 32 and 33 on piece 29 is such as to cause these clips to engage adjacent rungs on the ladder.

The forward latches are restrained in the degree of their maximum opening such that they hang open in a manner enabling them to be easily located over a rung of the ladder. Hence when, as shown in FIG. 7, the adjacent rungs on the ladder are engaged by the clips, the carriage is so coupled to the ladder as to convert it into a wheel-barrow or cart-like structure which may be easily handled by an individual to roll the ladder to the work site.

In practice, in lieu of a set of latched clips, the caddy may be formed with two sets of unlatched clips for light work on fairly smooth surfaces, such as driveways and lawns. However, for rough terrain, should two sets of unlatched clips be used they may become dislodged from the rungs of the ladder should the caddy wheels hit an obstacle. The latched clips are therefore desirable for heavy-duty use. When using the latched clip design, it is necessary always to orient the set of latched clips on the ladder so that the latches are forward. Otherwise the clips could become disengaged because of the turning moment involved when the wheels strike an obstacle and rapidly decelerate to zero forward speed.

In some instances, a barrier may be necessary to prevent the load from sliding off the truck. For this purpose a second carriage may be provided, but with a cross-piece interconnecting the legs and without wheels, so that the second carriage may be coupled to adjacent rungs with the legs projecting upwardly from the ladder, thereby converting the ladder to a utility truck. Also in this case, a lifter with a short pole may be used, the lifter being attachable to the underside of the ladder to provide a retractable rest for the truck.

Inasmuch as the typical homeowner often has occasion to use a ladder but has an infrequent need for a truck to carry heavy loads, with carriages of the type described herein, the homeowner need not purchase and store a truck, since he is now able to convert his ladder to a truck when the need therefor arises.

While there have been shown and described preferred embodiments of ladder aids in accordance with the invention, it will be appreciated that many changes and modifications may be made therein without, however, departing from the essential spirit thereof. For example, in lieu of wheels on the caddy, one may install skis when the caddy is intended for use over sand or snow. Alternatively, skis may include a retractable harness adapted to attach the skis onto the wheels.

We claim:

1. A retractable lifter to facilitate the raising and lowering of a ladder by a user who lacks sufficient strength to directly handle the ladder, said ladder having rod-like rungs extending between a pair of rails, said lifter comprising:

A. a long pole to provide an arm extension to the user of the lifter;

B. a transverse piece, one side of which is attached at its midpoint to the upper end of the pole, said piece having a length substantially equal to the space between said rails, and C. a pair of clips mounted on the opposite ends of the piece and extending slightly beyond said ends, whereby the outer faces of said clips are positioned directly adjacent said rails, each clip being formed of a resilient plastic block having flat outer faces and being cut to define a pair of spring jaws projecting forwardly with respect to the upper end of the pole and forming the banks of a circular cavity, said jaws being forced apart when applied to a rung engaged by the clips to admit the rung into said cavity which is dimensioned to freely accommodate same, whereby the clips may be rotated about the rung and the pole held at any desired angle relative to the ladder plane, said piece having a channel formation and said clip blocks being received within the channel and being secured thereto.

2. A lifter as set forth in claim 2, wherein said pipe is of electrically non-conductive material.

3. A lifter as set forth in claim 2, wherein the pole is formed of a hollow pipe and said piece is attached thereto by a plug welded to the piece and socketed in one end of the pole.

4. A lifter as set forth in claim 3, further including a cap closing the other end of the pole.

* * * * *